(12) United States Patent
Su et al.

(10) Patent No.: US 9,822,810 B2
(45) Date of Patent: Nov. 21, 2017

(54) FASTENER

(71) Applicant: TAIWAN SHAN YIN INTERNATIONAL CO., LTD., Kaohsiung (TW)

(72) Inventors: Kou-Tsair Su, Kaohsiung (TW); Yu-Jung Su, Kaohsiung (TW)

(73) Assignee: Taiwan Shan Yin International Co., Ltd., Kaohsiung (TW)

( * ) Notice: Subject to any disclaimer, the term of this patent is extended or adjusted under 35 U.S.C. 154(b) by 226 days.

(21) Appl. No.: 14/962,585

(22) Filed: Dec. 8, 2015

(65) Prior Publication Data
US 2017/0159692 A1    Jun. 8, 2017

(51) Int. Cl.
*F16B 25/00* (2006.01)
*F16B 25/10* (2006.01)

(52) U.S. Cl.
CPC ...... *F16B 25/0052* (2013.01); *F16B 25/0078* (2013.01); *F16B 25/103* (2013.01)

(58) Field of Classification Search
CPC .............. F16B 25/0015; F16B 25/0047; F16B 25/0052; F16B 25/0078
USPC .............. 411/386, 387.4, 414, 411, 309–311
See application file for complete search history.

(56) References Cited

U.S. PATENT DOCUMENTS

| | | | | |
|---|---|---|---|---|
| 72,633 | A * | 12/1867 | Harvey | F16B 25/00 411/414 |
| 3,479,921 | A * | 11/1969 | Omoto | B21H 3/027 411/416 |
| 3,742,541 | A * | 7/1973 | Ohmoto | B23G 5/06 408/217 |
| 4,544,313 | A * | 10/1985 | Grossberndt | F16B 25/0031 411/411 |
| 4,652,194 | A * | 3/1987 | Tajima | F16B 25/00 411/386 |
| 6,565,302 | B2 * | 5/2003 | Werner | F16B 25/00 411/411 |
| 6,672,813 | B1 * | 1/2004 | Kajita | F16B 25/0031 411/387.4 |
| 8,864,430 | B2 * | 10/2014 | Su | F16B 25/0015 411/386 |
| 2005/0186048 | A1 | 8/2005 | Dicke | |
| 2008/0080953 | A1 * | 4/2008 | Wu | F16B 25/0015 411/412 |
| 2016/0138640 | A1 * | 5/2016 | Chen | F16B 25/0047 411/416 |

* cited by examiner

*Primary Examiner* — Flemming Saether
(74) *Attorney, Agent, or Firm* — Rosenberg, Klein & Lee

(57) ABSTRACT

A fastener includes a shank, a head connected thereto, a drilling portion opposite to the head and a plurality of first threads and second threads spirally disposed on the shank. The second threads are affixed to the first threads and provided with a plurality of opening slots defined thereon. The opening slots expose portions of the first threads therethrough. The first threads divide the shank into a plurality of shank segments, each of which has a base part and a transition part extending outward from the base part to be inclined by 5 to 10 degrees. The opening slots formed on the second threads provide an auxiliary cutting effect and accommodate cut debris. The first threads reinforce the bearing and drilling force of the second threads. The inclined transition part helps increase the ability of resisting the driving torsion and attain an anti-loosening force, thereby increasing the fastening effect.

11 Claims, 11 Drawing Sheets

FASTENER

BACKGROUND OF THE INVENTION

1. Field of the Invention

This invention relates to a fastener and relates particularly to a fastener providing the tensile force and attaining an anti-loosening effect.

2. Description of the Related Art

Referring to FIG. 1 to FIG. 3, a U.S. Patent Application Publication No. 2005/0186048 discloses a thread-forming screw fastener 1 which comprises a shank 11, a head 12 disposed on the shank 11, a drilling portion 13 disposed on the shank 11, opposite to the head 12, and a plurality of threads 14 spirally disposed on the shank 11. Further, each of the threads 14 includes a plurality of connective wave troughs 141 disposed thereon. Each of the threads 14 has an upper surface 142 and a lower surface 143 opposite to the upper surface 142. The two surfaces 142, 143 converge at a wave crest 145. The wave crest 145 defines an included angle 144. Each wave trough 141 defines a trough angle 146. Accordingly, when the fastener 1 starts to drill, the wave troughs 141 execute a cutting action to cut debris of an object (not shown) to complete the fastening operation.

However, the disclosed fastener 1 still has problems. First, the threads 14 may easily be broken. Generally, the cutting efficiency of the threads 14 depends on the number of the trough angle 146. For example, if the trough angle 146 is too small, the cut debris provided with the elastic property may not enter the wave troughs 141 efficiently when the threads 14 carry out a speedy drilling action. This renders the wave troughs 141 unable to provide an auxiliary cutting for the threads 14. On the other hand, if the trough angle 146 is too large, the size of the threads 14 may be reduced to become a thinner structure. Such thinner structure is unable to effectively bear the drilling torque and is easily broken. Second, the drilling torsion cannot be reduced. Generally, the threads 14 are formed on the shank 11 by using a thread-rolling die (not shown). When the threads 14 are rolled and formed, the surface of the shank 11 becomes ragged or uneven. Thus, the shank 11 with the ragged surface may twist too much and may even snap when it cannot bear the drilling stress. Moreover, the drilling efficiency of the fastener 1 is affected by the number of the included angle 144 of each thread 14. For example, although the smaller included angle 144 provides a better cutting efficiency, the threads 14 are still unable to bear a larger screw-in torque at the time of drilling into a rigid object. Thus, the threads 14 get broken easily, and an uncompleted drilling action is incurred. On the other hand, although the larger included angle 144 provides a better bearing force for the threads 14, the cutting efficiency of the larger included angle 144 is still worse than the cutting efficiency of the smaller included angle 144 and the uncompleted drilling still occurs. Thus, the fastener 1 still needs to be improved.

SUMMARY OF THE INVENTION

The object of this invention is to provide a fastener capable of resisting the driving torsion and increasing the cutting efficiency in order to attain an anti-loosening effect and achieve a speedy drilling and positioning effect.

The fastener of this invention comprises a shank defining a central axis, a head disposed on one side of the shank, a drilling portion set on the other side of the shank, opposite to the head, and a plurality of first threads and second threads spirally formed on the shank. Each first thread has a first upper surface facing the head and a first lower surface facing the drilling portion. The first upper surface and the first lower surface extend radially from the shank to converge at a first ridge. The second threads are spirally formed on the shank and affixed to the first threads. Each second thread includes a second upper surface facing the head and a second lower surface facing the drilling portion. The second upper surface and the second lower surface extend radially from the shank to converge at a second ridge. Each second thread has a plurality of opening slots defined on the second upper surface and the second lower surface for exposing portions of the first threads through the opening slots. Moreover, the first threads divide the shank into a plurality of shank segments, each of which has abase part and a transition part extending outward from the base part. The transition part is inclined to the base part by 5 to 10 degrees.

According to the aforementioned structure, the first threads firmly support the second threads and reinforce the drilling strength of the second threads. Further, the opening slots of the second threads provide the first threads with an auxiliary cutting action and a debris accommodating room. The transition part which is inclinedly formed to make each shank segment formed like a truncated cone greatly increases the torsional resistance and the tensile force of the fastener during the drilling process and helps attain an anti-loosening effect after the drilling process is completed. Thus, the fastening and positioning effect of the fastener is greatly enhanced.

Preferably, the second ridge defines a line normal to the central axis of the shank. An upper included angle is defined between the second upper surface and the line of the second ridge. A lower included angle is defined between the second lower surface and the line of the second ridge. The upper included angle is smaller than the lower included angle.

Preferably, the upper included angle can be set from 0 to 5 degrees and the lower included angle can be set from 35 to 45 degrees.

Preferably, the first ridge has a first included angle, and the second ridge has a second included angle. The first included angle is smaller than the second included angle.

Preferably, a diameter of each of the first threads can be equal to or less than a diameter of each of the second threads.

Preferably, the second threads can be affixed to part or all of the first threads.

DETAILED DESCRIPTION OF THE PREFERRED EMBODIMENTS

Figure 1:
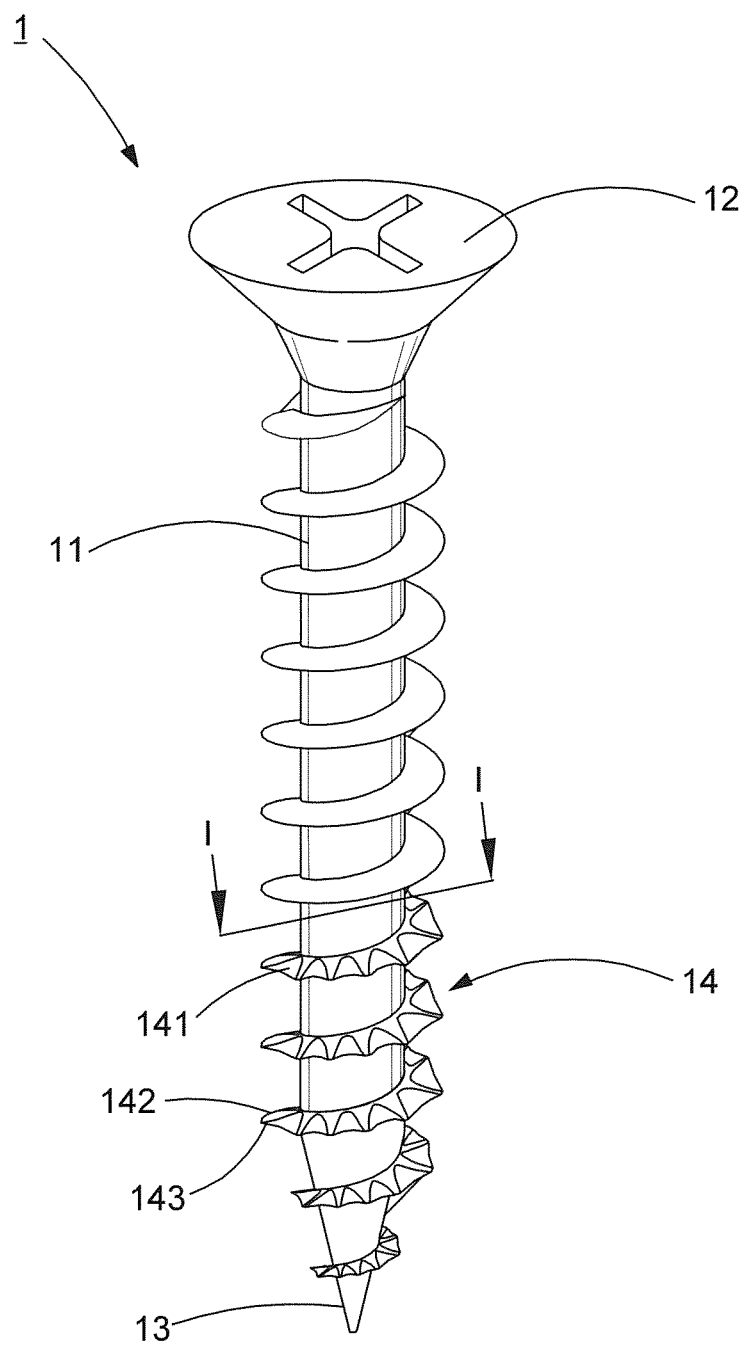
FIG. 1 is a schematic view showing a fastener of the U.S. patent application publication no. 2005/0186048.
Figure 2:
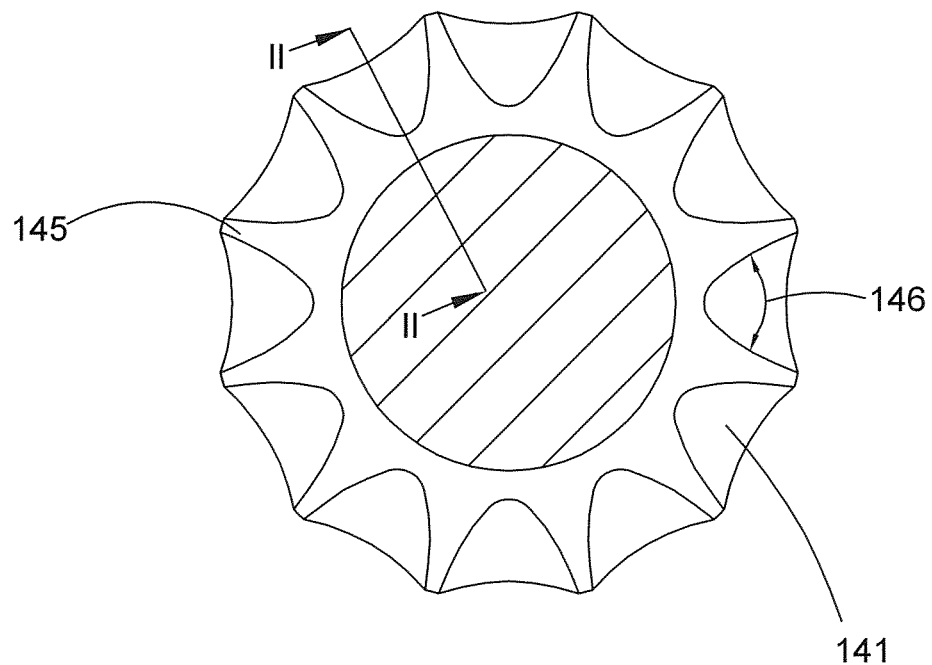
FIG. 2 is a top plan view showing a thread as seen along the line I-I of FIG. 1.
Figure 3:
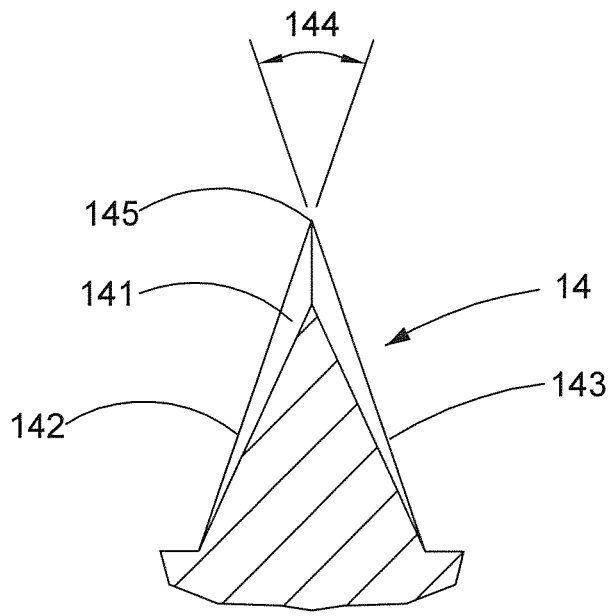
FIG. 3 is a cross-sectional view showing the thread as seen along the line II-II of FIG. 2.
Figures 4, 4A:
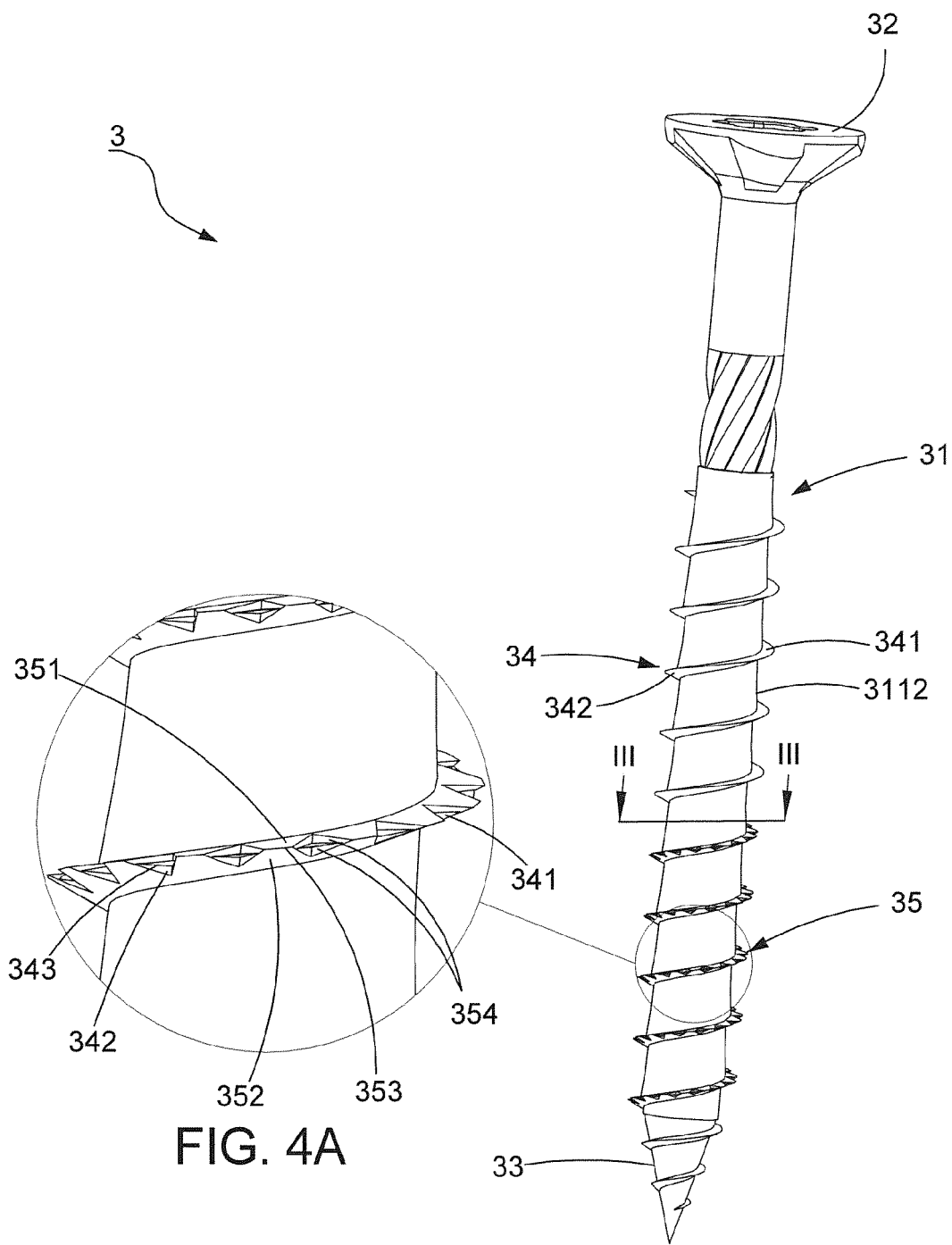
FIG. 4 is a schematic view showing a first preferred embodiment of this invention.
FIG. 4A is an enlarged view showing a partial element of FIG. 4.
Figures 5, 5A:
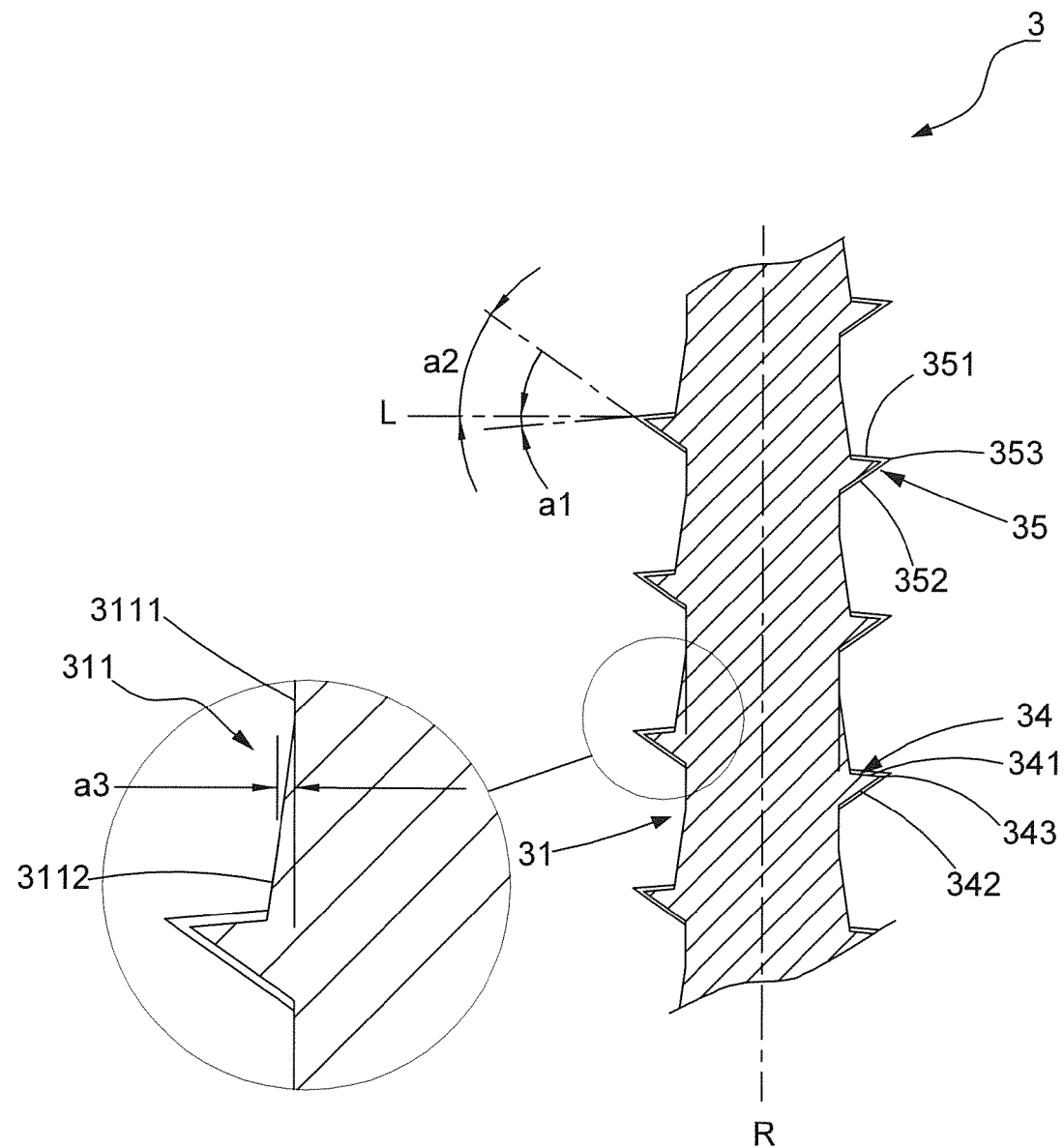
FIG. 5 is a cross-sectional view showing the first preferred embodiment of this invention.
FIG. 5A is an enlarged view showing a partial element of FIG. 5.

Referring to FIG. 4 to FIG. 5, a first preferred embodiment of a fastener 3 of this invention is disclosed. The fastener 3 includes a shank 31, a head 32 connected to the shank 31, a drilling portion 33 formed on the shank 31, opposite to the head 32, and a plurality of first threads 34 and second threads 35 spirally disposed on the shank 31. Referring to FIG. 4A, each first thread 34 extends from the drilling portion 33 toward the head 32 and includes a first upper surface 341 facing the head 32 and a first lower surface 342 facing the drilling portion 33. The first upper surface 341 and the first lower surface 342 extend radially from the shank 31 to converge at a first ridge 343.

The second threads 35 are spirally formed on the shank 31 and affixed to the first threads 34. The second threads 35 can be affixed to part of the first threads 34 (shown in FIG. 4) or affixed to all of the first threads 34 (shown in FIG. 9). In this embodiment, it is taken as an example that the second threads 35 are affixed to part of the first threads 34. Also referring to FIG. 4A, each second thread 35 has a second upper surface 351 facing the head 32, a second lower surface 352 facing the drilling portion 33. The second upper surface 351 and the second lower surface 352 extend radially from the shank 31 to converge at a second ridge 353. Each second thread 35 further has a plurality of opening slots 354 formed on each second upper surface 351 and each second lower surface 352. The opening slots 354 expose portions of the first threads 34 therethrough. In other words, the opening slot 354 of each second thread 35 exposes portions of the first upper and lower surface 341, 342, as illustrated. Referring to FIGS. 5 and 5A, the first threads 34 divide the shank 31 into a plurality of shank segments 311. Each shank segment 311 has a base part 3111 and a transition part 3112 following the base part 3111. The transition part 3112 extend outward from the base part 3111 and is inclined to the base part 3111 by 5 to 10 degrees so that the each of the shank segments 311 is shaped like a truncated cone. Thus, the shank 31 is capable of undertaking the driving torsion or stress which increases incessantly during the drilling process to prevent the shank 31 from twisting too much and breaking.

It is also noted that when the second threads 35, as shown in FIG. 4, are affixed to part of the first threads 34, each transition part 3112 can extend to connect some of the first upper surfaces 341 and some of the second upper surfaces 351. Alternatively, each transition part 3112 can extend to connect all of the second upper surfaces 351 when the second threads 35, as shown in FIG. 9, are affixed to all of the first threads 34.

Figure 7:
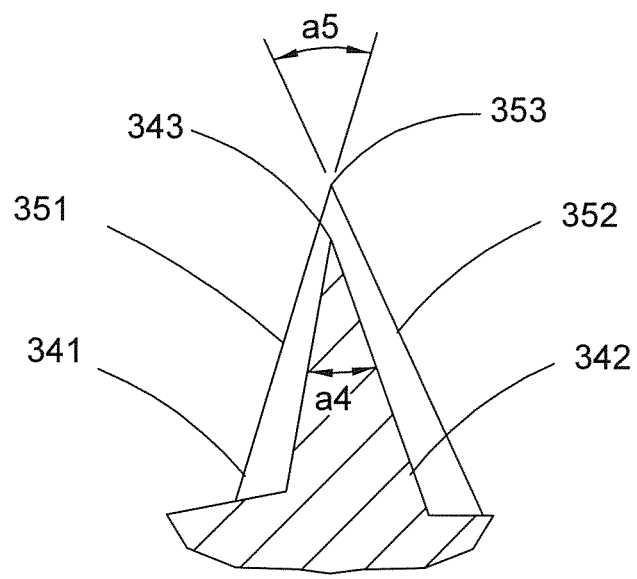
FIG. 7 is a cross-sectional view showing the first and second threads of this invention as seen along the line IV-IV of FIG. 6 where each of the threads is formed an asymmetrical design.
Figure 8:
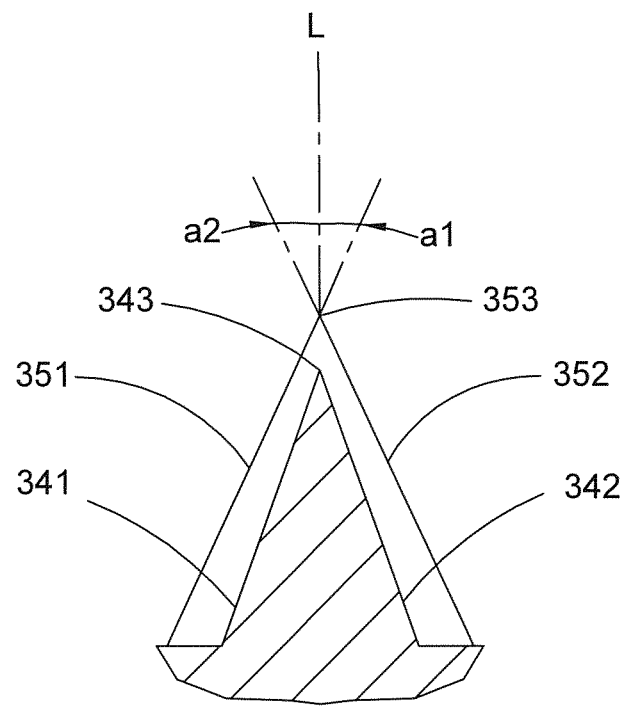
FIG. 8 is a cross-sectional view showing the second threads affixed to the first threads of this invention where each of the threads is formed a symmetrical design.

Meanwhile, referring to FIG. 5, a line L passing through each second ridge 353 is normal to a central axis R of the shank 31. An upper included angle a1 is defined between the second upper surface 351 and the line L of the second ridge 353, and a lower included angle a2 is defined between the second lower surface 352 and the line L of the second ridge 353. The upper included angle a1 is smaller than the lower included angle a2. Preferably, the upper included angle a1 can be set from 0 to 5 degrees and the lower included angle a2 can be set from 35 to 45 degrees. Thus, the second threads 35 can be formed into an asymmetrical design, as shown in FIG. 7. Alternatively, the second threads 35 can be formed into a symmetrical design, of which the upper and lower included angles a1, a2, as shown in FIG. 8, are the same. The asymmetrical design herein is adopted as an example. In addition, the first ridge 343 defines a first included angle a4, and the second ridge 353 defines a second included angle a5. The first included angle a4 is smaller than the second included angle a5, as shown in FIG. 7.

Figure 9:
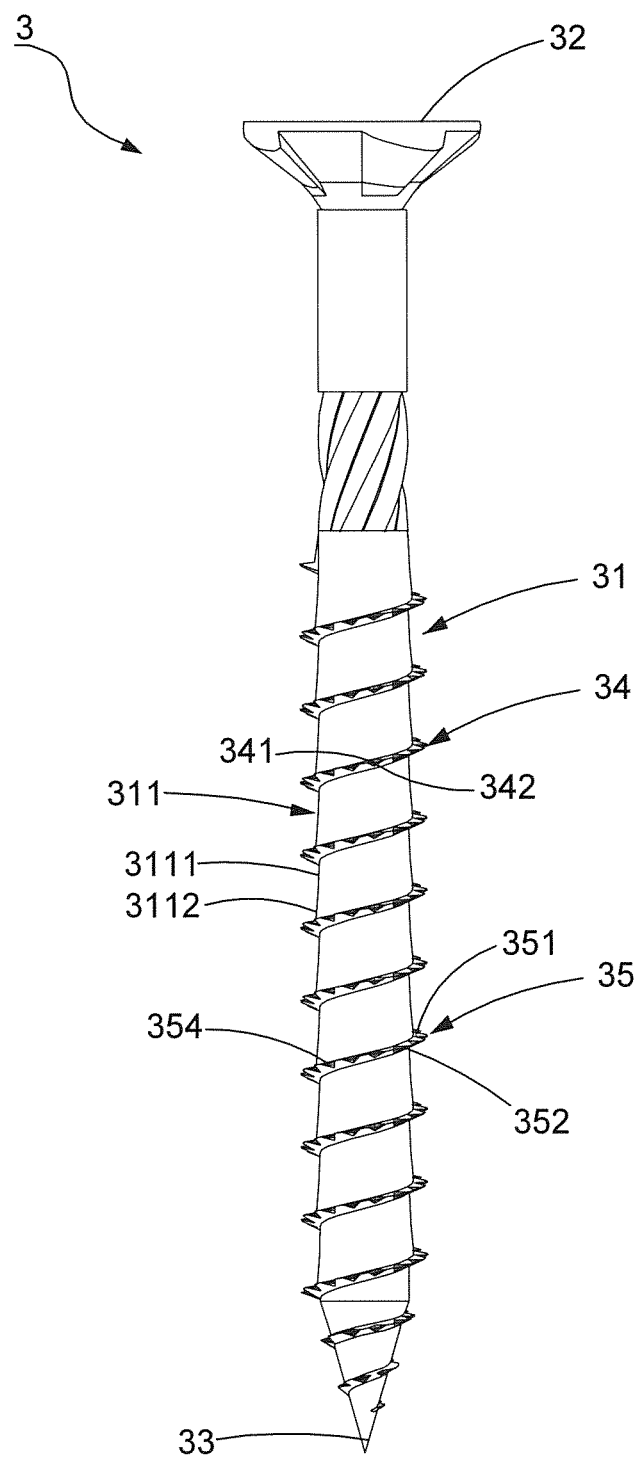
FIG. 9 is a schematic view showing another variation of FIG. 4.
Figure 10:
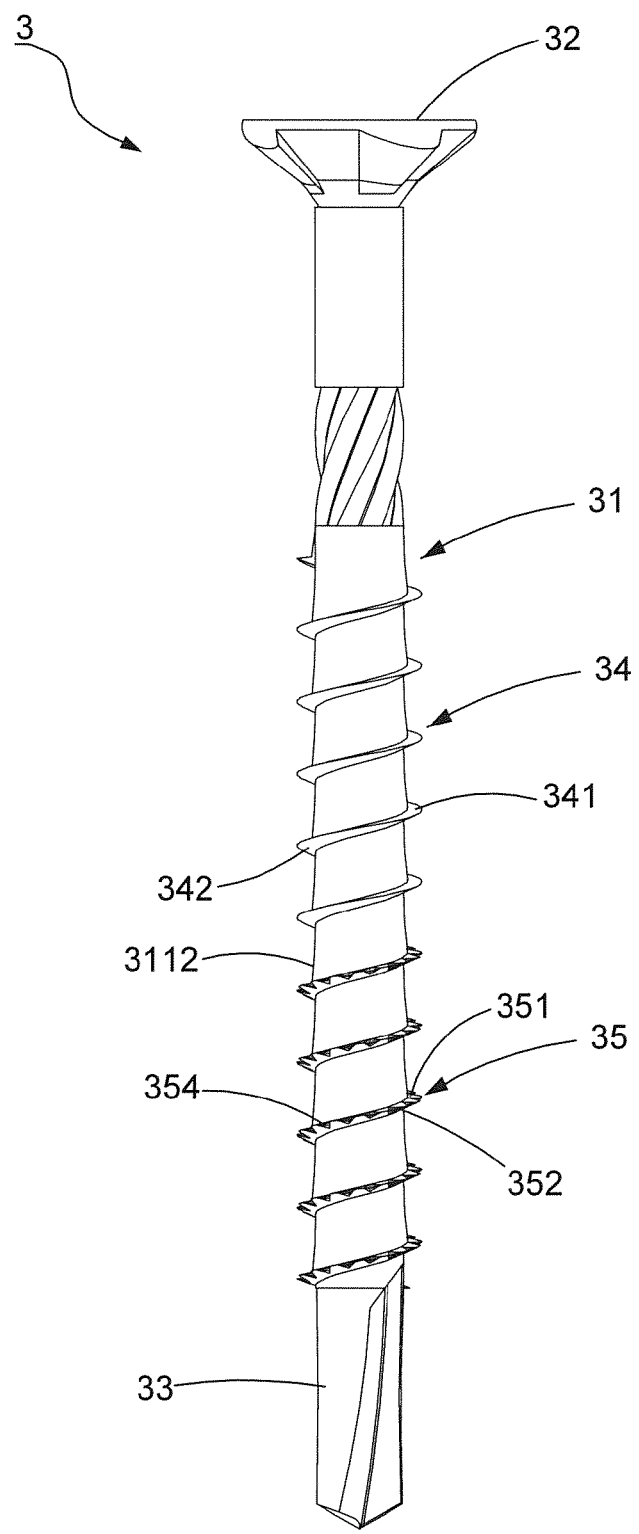
FIG. 10 is a schematic view showing another variation of the first preferred embodiment of this invention where the drilling portion is a drilling bit with slots formed thereon.
Figure 11:
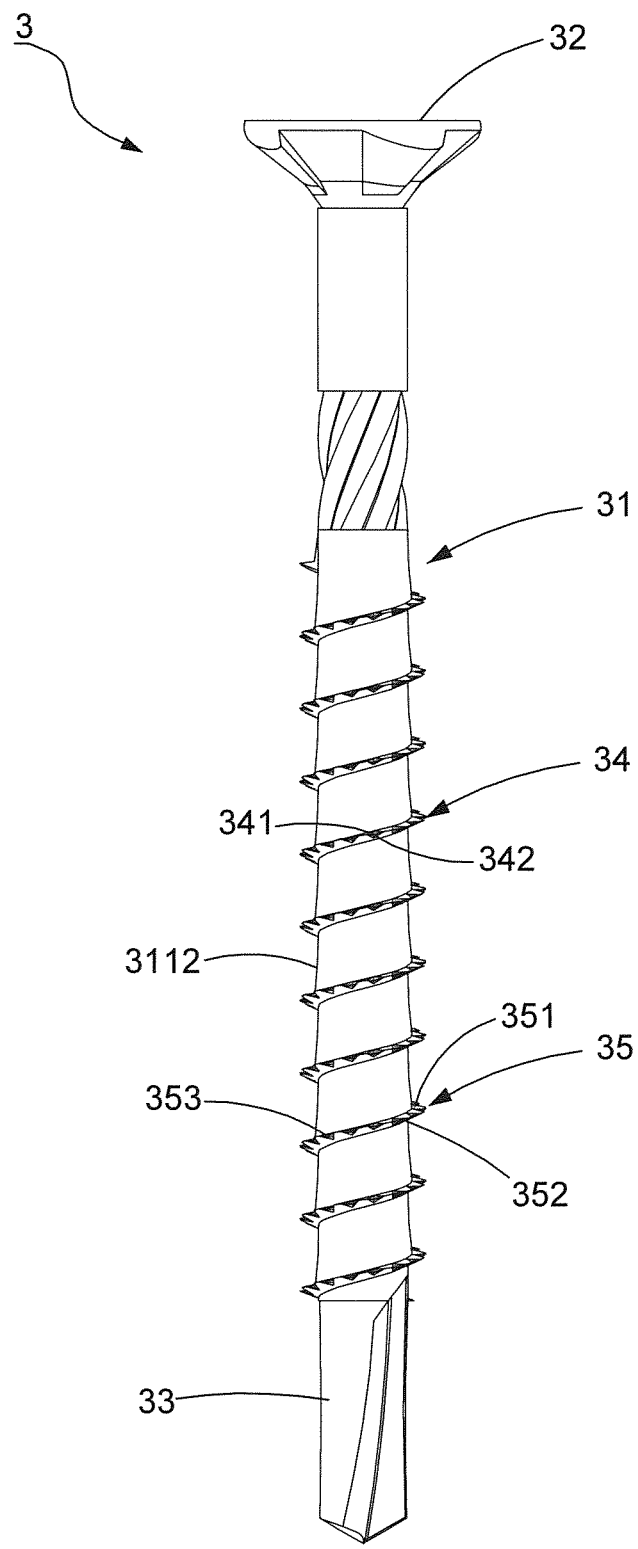
FIG. 11 is a schematic view showing another variation of FIG. 10.

Further, the drilling portion 33 can be, but not limited to, a sharp point shown in FIG. 4 and FIG. 9 or a drilling bit with slots shown in FIG. 10 and FIG. 11 in order to aim at various objects (not shown) for drilling.

The operation of this invention is described with the aid of FIGS. 4 to 7. To start a drilling operation, the head 32 receives a rotation force from a driving tool (not shown) in order to move the drilling portion 33 into an object (not shown) and synchronously rotates the first threads 34 and the second threads 35 to execute the drilling operation. Thus, the shank 31 is gradually screwed into the object. At the beginning of the drilling operation, the object is cut into debris by the second threads 35. The arrangement of the opening slots 354 disposed on each second upper surface 351 and each second lower surface 352 cuts the object into debris concurrently to provide an auxiliary cutting effect and also forms a room between the first threads 34 and the second threads 35 to accommodate the debris. Further, because the second threads 35 are affixed to the first threads 34, the first threads 34 can support the second threads 35 firmly to reinforce the strength and cutting capability of the second threads 35. When the first included angle a4 of each first thread 34 is smaller than second included angle a5 of each second thread 35, the structure strength and cutting capability of the first threads 34 and the second threads 35 can be promoted.

Furthermore, when the shank 31 keeps drilling into the object, the larger lower included angle a2 of each second thread 35 which provides each second lower surface 352 with a steeper slope and the existence of the transition parts 3112 inclined to the base parts 3111 of the shank 31 allow the shank 31 to be drilled in a vertical condition. Such condition helps reduce contact points where the second threads 35 come into contact with the object. It is also noted that the inclined transition parts 3112 extending outward from the base parts 3111 of the shank 31 can extend to connect to the first upper surfaces 341 and the second upper surfaces 351, thereby providing an auxiliary supporting effect for the first and second threads 34, 35. Thus, the shank 31 can resist and bear the driving torsion or stress which increases incessantly during the drilling operation to prevent the shank 31 from twisting too much and snapping and to prevent the break of the first and second threads 34, 35. Thus, the fastener 3 has a speedy cutting efficiency and provides a better anti-loosening and positioning effect.

Figure 6:
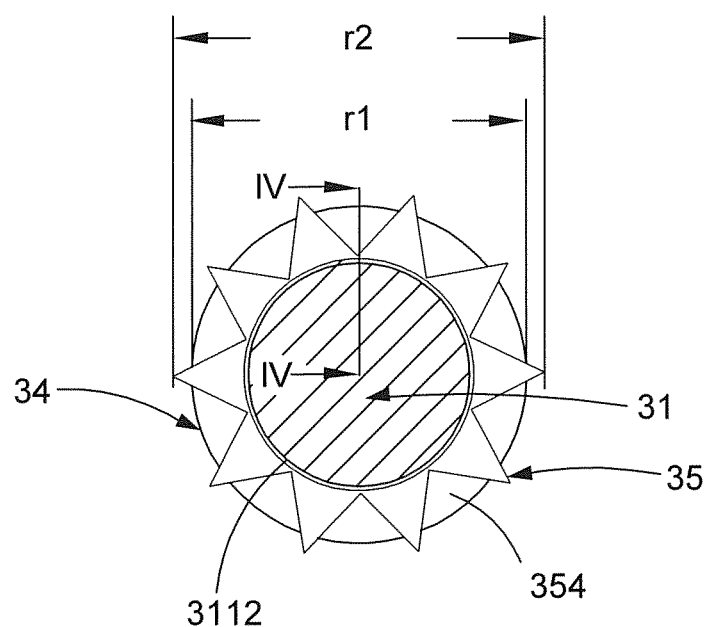
FIG. 6 is a top plan view as seen along the line III-III of FIG. 4.
Figure 12:
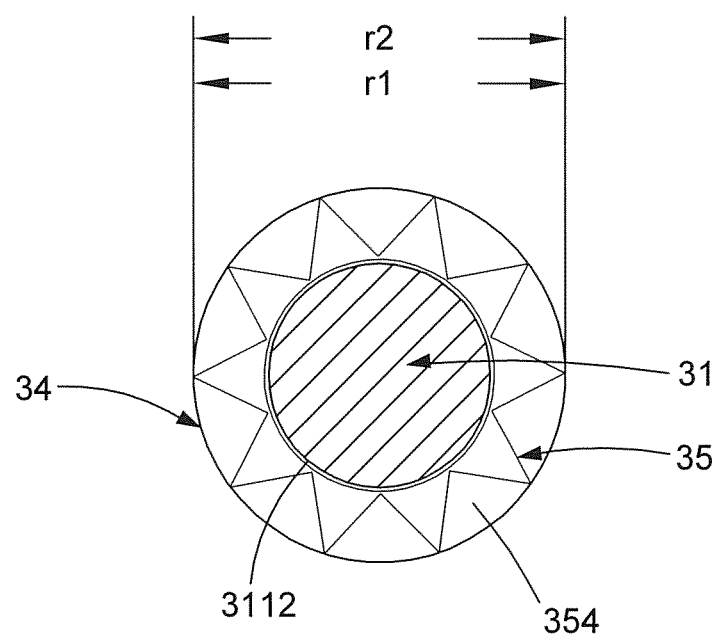
FIG. 12 is a top plan view showing another variation of FIG. 6.

Referring to FIG. 12, it shows that a diameter r1 of each first thread 34 is equal to a diameter r2 of each second thread 35. Alternatively, the diameter r1 of each first thread 34 can be less than the diameter r2 of each second thread 35, as shown in FIG. 6. Therefore, the opening slots 354 of the second threads 35 can assist the first and second threads 34, 35 in cutting the object into debris and provide a room sufficient to receive the debris. When the diameter r1 of each first thread 34 is equal to or less than the diameter r2 of each second thread 35, the strength of the second threads 35 against the driving torsion is reinforced by the first threads 34. Each inclined transition part 3112 of the shank 31, as shown in FIGS. 4, 9, 10 and 11, also provides an auxiliary supporting effect to increase the capability of resisting the driving torsion and the tensile force. Thus, the fastener 3 has a preferable bearing power and an increased drilling strength. Because the debris can be stored in the opening slots 354, the drilling resistance incurred by the accumulation of too much debris can be reduced to attain a rapid cutting speed and have a firm fastening and position effect.

To sum up, the fastener of this invention takes advantages of the second threads affixed to the first threads to allow the first threads to reinforce the strength of the second threads against the driving torsion. The opening slots of the second threads also provide the first threads with an auxiliary cutting action and a debris accommodating room. In addition, each shank segment shaped like a truncated cone by the inclined transition part relative to the base part offers an auxiliary supporting effect for the first and second threads to increase the capability of resisting the driving torsion and the tensile force and attain an anti-loosening effect after completing the drilling process. Thus, the fastening and positioning effect of the fastener can be greatly increased.

While the embodiments of this invention are shown and described, it is understood that further variations and modifications may be made without departing from the scope of this invention.

What is claimed is:

1. A fastener comprising a shank defining a central axis, a head connected to said shank, a drilling portion disposed on said shank, opposite to said head, and a plurality of first threads and second threads spirally formed on said shank, wherein each of said first threads includes a first upper surface facing said head and a first lower surface facing said drilling portion, said first upper surface and said first lower surface extending radially from said shank to converge at a first ridge, said second threads being spirally formed on said shank and affixed to said first threads, each of said second threads including a second upper surface facing said head and a second lower surface facing said drilling portion, said second upper surface and said second lower surface extending radially from said shank to converge at a second ridge, a plurality of opening slots being defined on each of said second upper surfaces and each of said second lower surfaces, said plurality of opening slots exposing portions of said first threads therethrough, said plurality of first threads dividing said shank into a plurality of shank segments, each of said shank segments having a base part and a transition part extending outward from said base part, said transition part being inclined to said base part by 5 to 10 degrees.

2. The fastener as claimed in claim 1, wherein said second ridge defines a line normal to said central axis of said shank, an upper included angle being defined between said second upper surface and said line of said second ridge, a lower included angle being defined between said second lower surface and said line of said second ridge, said upper included angle being smaller than said lower included angle.

3. The fastener as claimed in claim 2, wherein said upper included angle is set from 0 to 5 degrees, and said lower included angle is set from 35 to 45 degrees.

4. The fastener as claimed in claim 1, wherein said first ridge has a first included angle, said second ridge having a second included angle, said first included angle being smaller than said second included angle.

5. The fastener as claimed in claim 3, wherein said first ridge has a first included angle, said second ridge having a second included angle, said first included angle being smaller than said second included angle.

6. The fastener as claimed in claim 1, wherein a diameter of each of said first threads is equal to a diameter of each of said second threads.

7. The fastener as claimed in claim 5, wherein a diameter of each of said first threads is equal to a diameter of each of said second threads.

8. The fastener as claimed in claim 1, wherein a diameter of each of said first threads is less than a diameter of each of said second threads.

9. The fastener as claimed in claim 5, wherein a diameter of each of said first threads is less than a diameter of each of said second threads.

10. The fastener as claimed in claim 1, wherein said second threads are affixed to part of said first threads.

11. The fastener as claimed in claim 1, wherein said second threads are affixed to all of said first threads.

* * * * *